(12) United States Patent
Rye

(10) Patent No.: US 11,206,819 B1
(45) Date of Patent: Dec. 28, 2021

(54) LURE WITH IMPACTING BLADE MEMBERS

(71) Applicant: Ryan Patrick Rye, Lawrenceville, GA (US)

(72) Inventor: Ryan Patrick Rye, Lawrenceville, GA (US)

( * ) Notice: Subject to any disclaimer, the term of this patent is extended or adjusted under 35 U.S.C. 154(b) by 341 days.

(21) Appl. No.: 16/030,582

(22) Filed: Jul. 9, 2018

(51) Int. Cl.
*A01K 85/10* (2006.01)
*A01K 85/02* (2006.01)
*A01K 85/16* (2006.01)
*A01K 85/08* (2006.01)
*A01K 95/00* (2006.01)

(52) U.S. Cl.
CPC .............. *A01K 85/10* (2013.01); *A01K 85/02* (2013.01); *A01K 85/08* (2013.01); *A01K 85/16* (2013.01); *A01K 95/00* (2013.01)

(58) Field of Classification Search
CPC ........ A01K 85/00; A01K 85/01; A01K 85/10; A01K 85/12; A01K 85/14; A01K 85/18; A01K 85/16; A01K 95/00
USPC ..... 43/42.13, 42.31, 42, 42.11, 42.14, 42.19, 43/42.24, 42.25, 42.39, 42.5
See application file for complete search history.

(56) References Cited

U.S. PATENT DOCUMENTS

| | | | | |
|---|---|---|---|---|
| 1,383,546 A | * | 7/1921 | Knowles | A01K 85/10 43/42.36 |
| 2,889,657 A | * | 6/1959 | Bowman | A01K 85/14 43/42.06 |
| 4,599,821 A | * | 7/1986 | Martin | A01K 85/10 43/42.22 |
| 4,641,455 A | * | 2/1987 | Johnson | A01K 85/01 43/42.13 |
| 4,793,089 A | * | 12/1988 | Long | A01K 85/00 43/42.13 |
| 4,962,610 A | * | 10/1990 | Bleam | A01K 85/14 43/42.5 |
| 5,050,334 A | * | 9/1991 | Standish, Jr. | A01K 85/01 43/42.13 |
| 5,226,268 A | * | 7/1993 | Sisson, Jr. | A01K 85/00 43/42.11 |
| 5,355,612 A | * | 10/1994 | Smith | A01K 85/00 43/42.11 |
| 5,499,470 A | * | 3/1996 | Reed | A01K 85/00 43/42.06 |
| 5,605,004 A | * | 2/1997 | Boullt | A01K 85/00 43/42.13 |
| 5,680,726 A | * | 10/1997 | Sassone | A01K 83/00 43/42.39 |
| 5,887,378 A | * | 3/1999 | Rhoten | A01K 85/14 43/42.03 |
| 6,360,476 B1 | * | 3/2002 | Anastacio | A01K 85/01 43/42.31 |

(Continued)

OTHER PUBLICATIONS https://www.cabelas.com/product/Booyah-reg-Buzz-Baits/728083.uts.

*Primary Examiner* — Lisa L Tsang

(57) ABSTRACT

A fishing lure comprises a wire form member having a first leg and second leg, a weighted member coupled to the second leg, and a line attachment point located between the first leg and second leg. A first blade member is pivotably coupled to the first leg, while a second blade member is rotatably coupled to the wire form member and positioned between the first blade member and the weighted member.

7 Claims, 6 Drawing Sheets

(56) References Cited

U.S. PATENT DOCUMENTS

| | | | | |
|---|---|---|---|---|
| 7,197,846 B1* | 4/2007 | Gibson | A01K 85/00 | |
| | | | 43/42.08 | |
| 8,733,012 B2* | 5/2014 | Thorne | A01K 85/00 | |
| | | | 43/42.24 | |
| 8,857,099 B1* | 10/2014 | Hamrick, Jr | A01K 85/00 | |
| | | | 43/42.19 | |
| 8,919,033 B2* | 12/2014 | Davis | A01K 85/02 | |
| | | | 43/42.39 | |
| 9,485,975 B1* | 11/2016 | Rye | A01K 85/01 | |
| 10,834,909 B1* | 11/2020 | Rye | A01K 85/10 | |
| 2003/0037478 A1* | 2/2003 | Hisaw | A01K 85/00 | |
| | | | 43/17.1 | |
| 2003/0046856 A1* | 3/2003 | Klapka | A01K 85/01 | |
| | | | 43/42.06 | |
| 2004/0006908 A1* | 1/2004 | Essad | A01K 85/00 | |
| | | | 43/42.13 | |
| 2004/0123510 A1* | 7/2004 | Essad | A01K 85/00 | |
| | | | 43/42.13 | |
| 2004/0221502 A1* | 11/2004 | Eubanks | A01K 85/00 | |
| | | | 43/42.13 | |
| 2005/0086849 A1* | 4/2005 | Perrick | A01K 85/08 | |
| | | | 43/42.47 | |
| 2005/0155273 A1* | 7/2005 | Phipps | A01K 85/01 | |
| | | | 43/42.31 | |
| 2008/0098641 A1 | 5/2008 | Brewer | | |
| 2008/0172923 A1* | 7/2008 | Nicholson | A01K 85/00 | |
| | | | 43/42.19 | |
| 2008/0202015 A1* | 8/2008 | Langer | A01K 85/18 | |
| | | | 43/42.06 | |
| 2008/0263935 A1* | 10/2008 | Albrecht | A01K 85/10 | |
| | | | 43/42.13 | |
| 2015/0223437 A1* | 8/2015 | Tamburro | A01K 85/00 | |
| | | | 43/42.04 | |
| 2016/0057983 A1* | 3/2016 | Furuya | A01K 85/12 | |
| | | | 43/4 | |
| 2016/0366863 A1* | 12/2016 | Caraballo, Sr. | A01K 85/08 | |
| 2017/0339933 A1* | 11/2017 | Smith | A01K 85/10 | |
| 2017/0347635 A1* | 12/2017 | Sandefur | A01K 85/02 | |
| 2018/0125045 A1* | 5/2018 | Ishikawa | A01K 85/12 | |
| 2019/0029239 A1* | 1/2019 | Schwartz | A01K 85/18 | |
| 2019/0104711 A1* | 4/2019 | Coxey | A01K 85/01 | |
| 2020/0344986 A1* | 11/2020 | Queen | A01K 85/14 | |

* cited by examiner

LURE WITH IMPACTING BLADE MEMBERS

BACKGROUND INFORMATION

This disclosure relates to a fishing lure wherein two or more blade members are loosely coupled to a wire form member, wherein a first blade member provides the necessary lift to pull the lure to the top of the water surface, while a rotating second blade member is able to impact the first blade member as the lure moves forward. The resulting impacts generate noise and disrupt water, which result in fish-attracting sounds and movements.

Common topwater propeller lures feature a rotating propeller on the end of a wire frame, with a free-swinging vane attached to a portion of the wire frame between the propeller and the hook. Impact sounds are generated each time the vane randomly strikes the rotating propeller. A disadvantage of these lures is that the propeller must be substantially large to generate the necessary amount of lift to bring the lure to the top of the water surface. Due to its large size, such a propeller has a large amount of air resistance when the lure is cast. This causes bothersome backlashes in an angler's reel, and it also results in an angler not being able to throw the lure the desired distance.

It would be more advantageous if the blade creating the necessary lift were smaller and more aerodynamic, as a smaller blade means further casting distances and less retrieval effort by an angler. A more fishable lure would also not have the rotating blade be the lift-generating blade, as half of the rotating blade must be out of the water (above the surface) in order to keep the lure moving along the top of the water. In other words, by locating the rotating blade instead between a top pivoting lift-generating blade and the head of the lure, less effort is required to keep the lure on the top of the surface, and a more unique underwater trailing disturbance of the lure can be generated by the now completely submerged rotation blade member.

SUMMARY OF THE INVENTION

A fishing lure consists of a wire form member with a first blade member coupled to the wire form member, a weighted member coupled to the wire form member, and a second blade member coupled to the wire form member and located between the first blade member and the weighted member. The first blade member is pivotably coupled to the wire form member through one or more through holes and is free to tilt front-to-back slightly, while the second blade member is free to spin clockwise or counterclockwise. When the lure is pulled forward, the rotating second blade member can impact the constrained—but pivotable—first blade member, generating fish-attracting sounds and movements.

Figure 1:
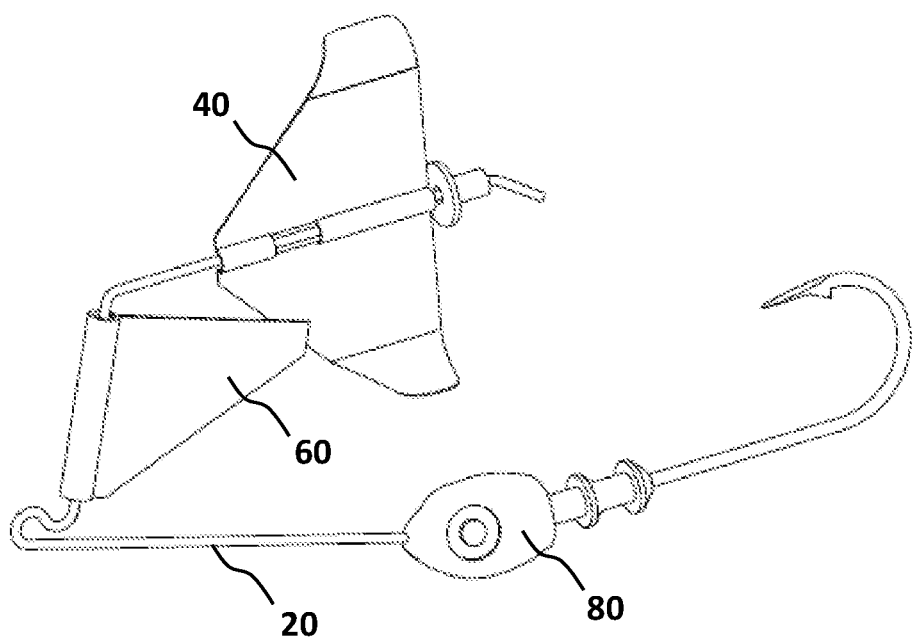
FIG. 1 is a diagrammatic perspective view of prior art.

REFERENCE NUMERALS 20 wire form member
40 first blade member
60 second blade member
70 longitudinal axis
80 weighted member
100 looped portion
120 first leg
140 second leg
160 eyelet
180 hook
200 skirt
210 first leg apex
220 swivel
230 first bend apex
240 spacer member
260 first through hole
280 second through hole
300 center of mass
320 trailing region
330 forward region
340 tip region
360 concave side
370 convex side
380 first face
400 opposite face
420 slot
440 additional through hole
460 front-to-back direction
480 leading end
500 trailing end
520 most forward pivot orientation
540 most rearward pivot orientation
560 first leg plane
580 forward side
600 rearward side
620 pivot angle
640 first section
660 second section
680 terminal end
700 top spacer member

DETAILED DESCRIPTION OF PREFERRED EMBODIMENTS

FIG. 1 illustrates prior art, which is a lure comprised of a wire form member 20, first blade member 40, second blade member 60, and weighted member 80. The first blade member 40 consists of a propeller-type shape that spins freely and continuously as the lure is pulled forward, while the second blade member 60 is free to swing on the wire form member 20 and is randomly impacted by the spinning first blade member 40.

There are several problems with such a design. For example, the first blade member 40 provides no underwater lift to help bring the bait to the water surface. As a result, the lure remains underwater unless the angler retrieves it at a very high speed in order to keep half of the spinning propeller above the water surface. Secondly, the first blade member 40 must have ever-increasing surface area in order to help keep the lure moving along the water surface after an angler first reels fast enough to initially bring the lure to the surface. Another problem with a first blade member 40 with a large surface area is that it generates substantial aerodynamic drag on the lure when the lure is cast by an angler. And, by being a propeller shape, the first blade member 40 also spins as it the bait is cast through the air. For both of these reasons, the lure does not travel as far as it would if the first blade member 40 were not a propeller. In addition, the mid-air deceleration of the lure can cause an angler's reel to "backlash," where the line is no longer "pulled" off of the reel by the momentum of the cast lure but rather "pushed" off the reel by the spinning reel spool. The resulting backlash is a tangle of the fishing line around the reel spool caused by the spool spinning faster than the lure is being cast, and typically the bait sinks uselessly to the bottom while the angler attempts to fix the tangled web of fishing line.

The second blade member 60 of prior art also acts to slow down the rotation speed of the first blade member 40, but again this rotation speed of the first blade member 40 must remain high in order that the lure not easily sink when retrieved. Thus, more effort is required by an angler to keep the lure moving along the top of the water. Another disadvantage is that the lure of prior art cannot be retrieved slowly, as the propeller rotation speed is dependent on angler retrieval speed, and the lure will easily sink if the rotation speed of the first blade member 40 (or retrieval speed) slows. Decreasing the mass of the weighed member 80 can help alleviate this problem, but less overall weight again translates to an undesirably short casting distance.

Figure 2A:
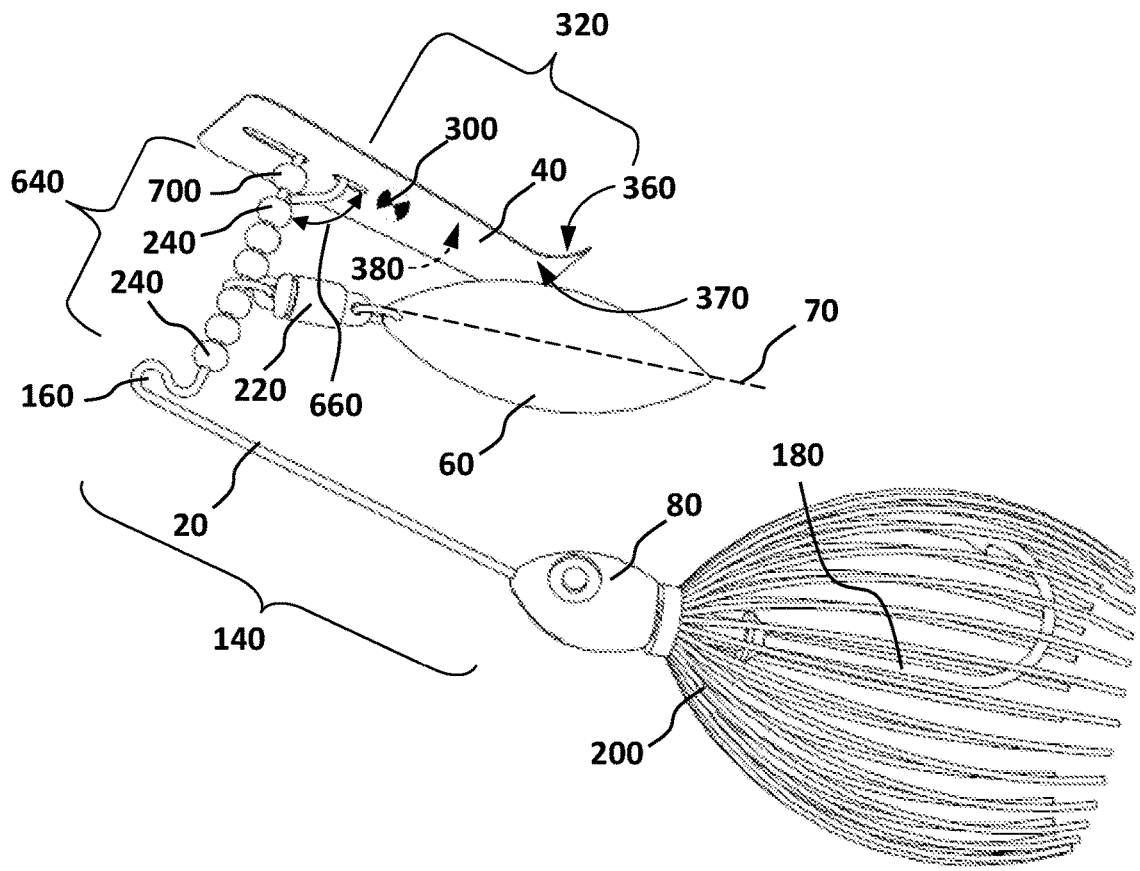
FIG. 2A is a diagrammatic perspective view of a first preferred embodiment of a lure with pivotable blade, in accordance with the present invention.
Figure 2B:
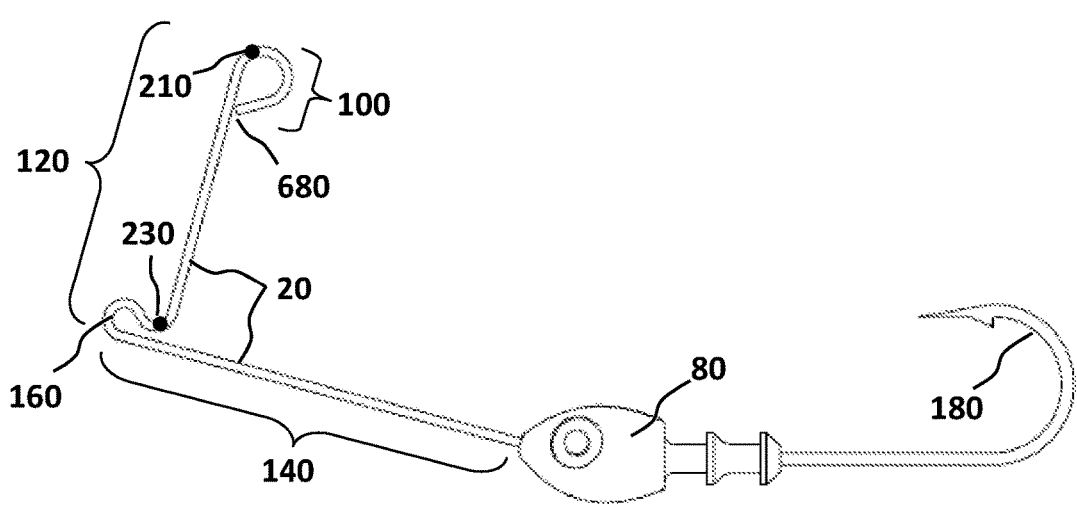
FIG. 2B is a diagrammatic side view of the wire form member, weighted member, and hook of the first preferred embodiment.
Figure 2C:
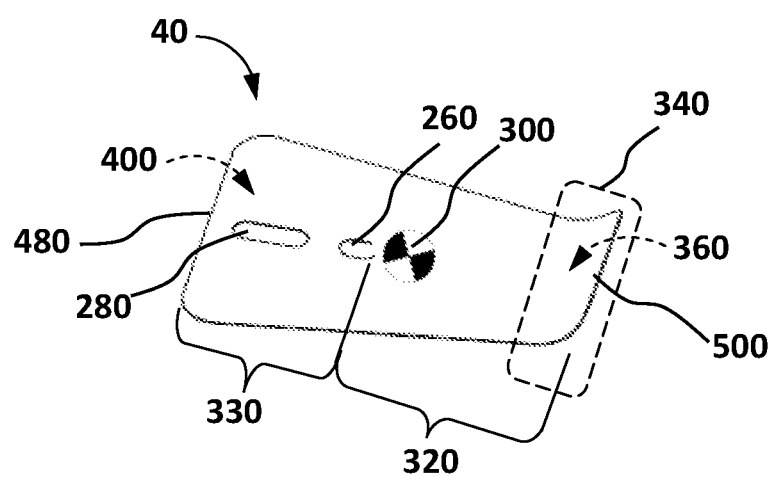
FIG. 2C is a diagrammatic perspective view of the first blade member of the first preferred embodiment.

FIG. 2A is a first preferred embodiment of a lure with pivotable blade, and is comprised of a wire form member 20, first blade member 40, second blade member 60 spinning about its own longitudinal axis 70, and weighted member 80. FIG. 2B is a side view providing more detail of the wire form member 20 and weighted member 80, while FIG. 2C is a perspective view of the first blade member 40. As shown in FIG. 2A, the first blade member 40 is pivotably coupled within a looped portion 100 of the wire form member 20. Note that the first blade member 40 can also be described as being slidably coupled to the wire form member 20, as it is obvious that the first blade member 40 is capable of sliding within the looped portion 100 of the wire form member 20 to which it is mounted. The first blade member 40 cannot rotate more than 360 degrees relative to the wire form member 20, unlike the blade member of prior art FIG. 1. Said differently, in all preferred embodiments described herein, the first blade member 40 is not connected to the wire form member 20 via a swivel; that is, the two are coupled together via a swivel-less connection. The wire form member 20 of any embodiment herein is simply a metal wire bent into any predetermined shape, and in this first embodiment the predetermined shape is comprised of a first leg 120 and a second leg 140, with the looped portion 100 located at the end of the first leg 120 and the weighted member 80 rigidly coupled to the wire form member 20. Note that only one looped portion 100 is required along the first leg 120 when constructing the two-bladed lure, wherein the blade located farther from the weighted member 80 can only pivot, while the blade located closer to the weighted member 80 spins about its own longitudinal axis 70. In this first preferred embodiment, the looped portion 100 is located at a first end of the wire form member 20, and the weighted member 80 is located at the opposite end of the wire form member 20. Note that although the weighted member 80 can be pivotably or loosely coupled to the wire form member 20, the rigid coupling helps prevent the lure from snagging on limbs or rocks during retrieval. An eyelet 160 is located between the first leg 120 and the second leg 140, and a fishing line or leader can be attached to the eyelet 160. A hook 180, ending in a hook point, extends rearward from the weighted member 80, and a skirt 200 or soft elastomeric trailer can be attached to the weighted member 80 to help disguise the hook 180. In this preferred embodiment, the wire form member 20 has a general "V" or "L" type shape. The first leg 120 can be further characterized by a first leg apex 210, which is defined as the point along the first leg 120 located farthest from the weighted member 80, and a first bend apex 230, which is a point along the wire form member 20 located between the eyelet 160 and first leg 120. An alternate definition of the first bend apex 230 is that it is the point along the wire form member 20 where the eyelet 160 ends and the first leg 120 begins, or the point where the eyelet 160 and first leg 120 are joined.

In FIGS. 2A-2B, the first leg 120 can also be characterized as having a first section 640 located between said eyelet 160 and said first blade member 40 and second section 660 located between said first blade member 40 and the terminal end 680 of the first leg 120. The terminal end 680 of this embodiment is shown as a free end. That is, the terminal end 680 is not embedded within a weight, body, or any other lure component.

The second blade member 60 is shown rotatably coupled to the wire form member 20 through a swivel 220, and at least one spacer member 240 is used to position the second blade member 60 at the desired distance relative to the first blade member 40, yet also keep the second blade member 60 sufficiently away from the eyelet 160. If the second blade member 60 is too close to the first blade member 40, then the second blade member 60 will not make the desired level of impact sounds when striking the first blade member 40 during rotation. Also, if the second blade member 60 is too close to the eyelet 160, then the second blade member 60 can wrap around the second leg 140 or wrap around the fishing line during casting and prevent the desired behavior of the lure. The spinning motion of the second blade member 60 also helps to the lure generally upright or stable as it is pulled forward in water. Said differently, the lure does not spiral out of control or spin more than 360 degrees relative to an attached fishing line when the lure is retrieved. From observing FIGS. 2A and 2B, it is obvious that the second blade member 60 is located between the first blade member 40 and the weighted member 80. The second blade member 60 is able to remain positioned at this location in space since it spins about its own longitudinal axis 70, which is the axis that extends from the nose to the tail of the second blade member 60.

FIG. 2A shows the top spacer member 700 held by, or secured by, the second section 660 of the first leg 120 of the wire form member 20. In other words, the top spacer member 700 is not capable of sliding farther down the first leg 120 towards the eyelet 160 since the second section 660 is able to touch, or be in contact with, the top spacer member 700 and prevent such a downward sliding movement. Thus, the same wire form component that defines the first leg 120 and second leg 140 is also able to hold the top spacer member 700 at a predetermined position along the first leg 120 away from the eyelet 160.

The geometry of the first blade member 40 is illustrated in FIG. 2C, and more clearly shows a first through hole 260 and second through hole 280. In FIG. 2C and FIG. 2A, it can be observed that both through holes are non-circular. More precisely, both through holes are elongated in shape, with one elongated through hole being more elongated than the other. Blade geometry is also important in order that the first blade member 40 be able to freely pivot or slide front-to-back in order to allow impacts from the spinning second blade member 60. For this to occur, the center-of-mass 300 of the first blade member should be located between the looped portion 100 and the weighted member 80. For blade members that are of generally uniform thickness, another way of interpreting this is by stating that a majority of the surface area of the first blade member 40 should be located in the trailing region 320 of the first blade member 40. The trailing region 320 is shown as the portion of the first blade member 40 between the first through hole 260 and the trailing end 500, while a forward region 330 is shown as the portion of the first blade member 40 between the first through hole 260 and the leading end 480. Note that the tip region 340 of the first blade member 40 is slightly concave in order to help generate more lift on the lure when the lure is fished as a topwater-type bait. For the desired topwater-style form factor of the first preferred embodiment, a concave side 360 of this tip region 340 faces the water surface, or faces away from the weighted member 80, while an opposite convex side 370, more easily seen in FIG. 2A, faces away from the water surface and is the side that clearly receives the spinning impacts of the second blade member 60. It should be noted that If the concave side 360 within the trailing region 320 faced the opposite direction, then the lure would remain underwater during retrieval instead of easily rising and skiing along the water's surface during retrieval. Although the first blade member 40 of this preferred embodiment has a concave tip region 340, most of the first blade member 40 is flat, or not substantially concave-facing or convex-facing in one particular direction. This differs from the shape of the second blade member 60 shown, wherein most of the blade has a common concave shape in order to facilitate clockwise or counterclockwise rotations.

The orientation of the first blade member 40 is also important. Having a first face 380 and opposite face 400, the first blade member 40 is pivotably constrained to the looped portion 100 of the wire form member 20 such that the first face 380 substantially faces the eyelet 160 during retrieval. The front-most part of the first blade member 40 defines a leading end 480, while the rear-most part of the first blade member 40 defines a trailing end 500.

Figure 2D:
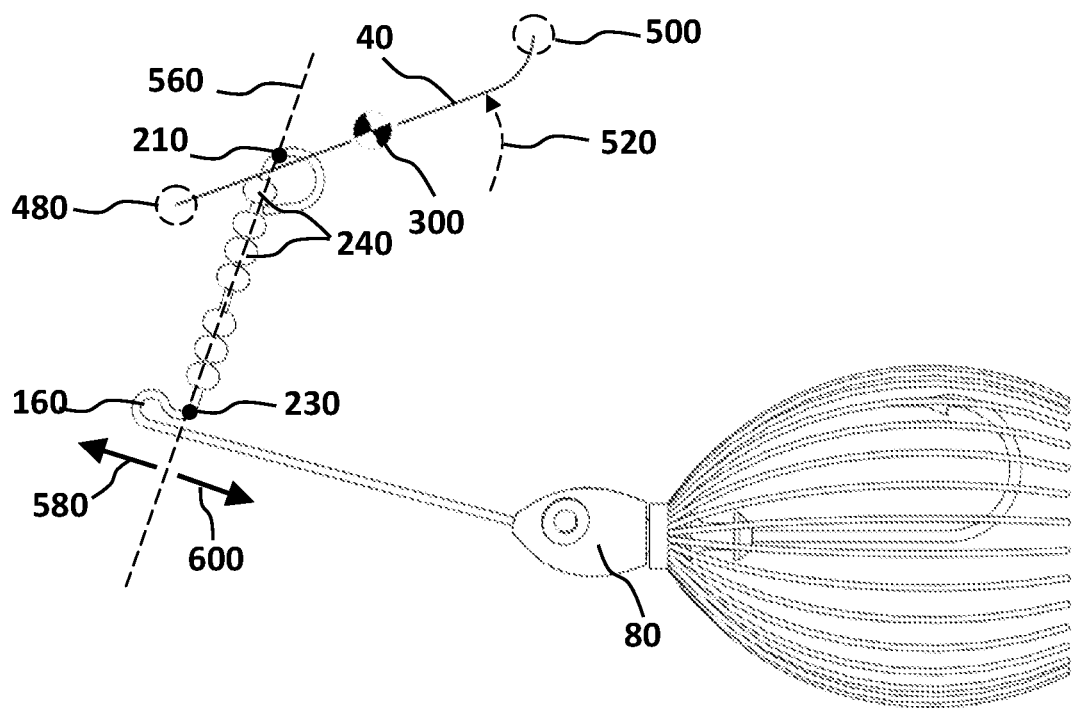
FIG. 2D is a diagrammatic side view of the first preferred embodiment with the second blade member removed, illustrating the most counterclockwise possible orientation of the first blade member.
Figure 2E:
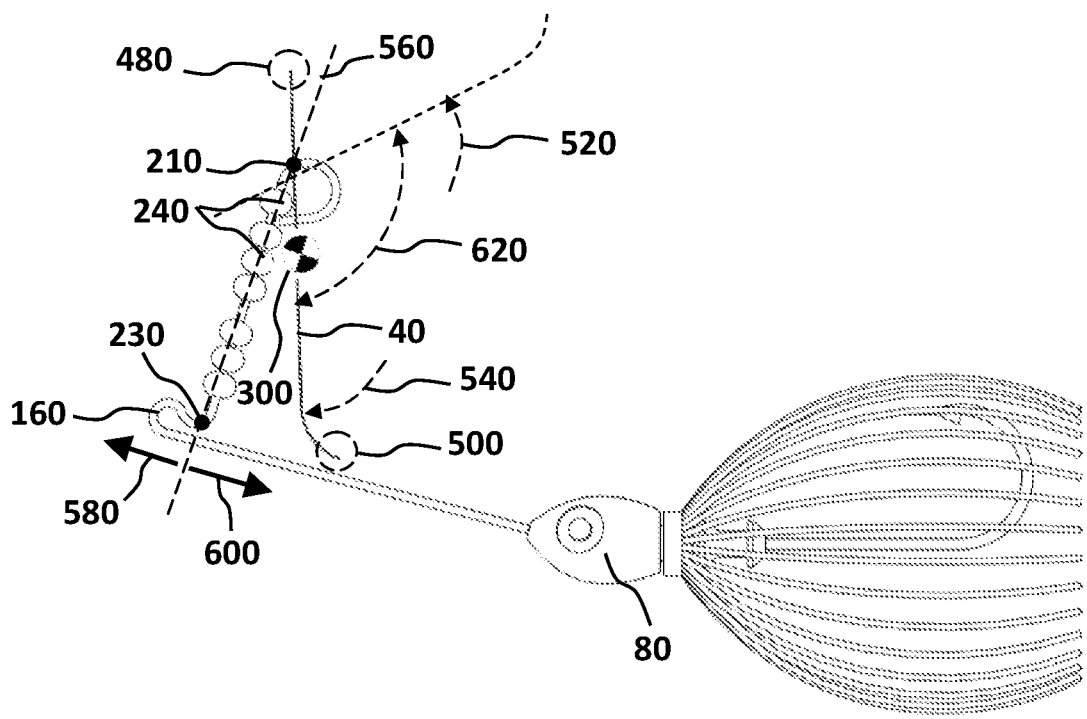
FIG. 2E is a diagrammatic side view of the first preferred embodiment with the second blade member removed, illustrating the most clockwise possible orientation of the first blade member.

FIGS. 2D and 2E describe constraints imposed on the first blade member 40. To help clearly observe these constraints, the second blade member 60 is not shown in FIGS. 2D and 2E, although the second blade member 60 would be present on the actual completed lure. In FIG. 2D, the first blade member 40 is shown in its most forward pivot orientation 520 that is possible due to the constraints imposed by the mounting apertures of the first blade member 40 and presence of one or more spacer members 240, while in FIG. 2E, the first blade member 40 is shown in its most rearward pivot orientation 540 that is possible. With a median plane of any object dividing that object into equal left and right halves, the median plane of the lure can be defined as a plane that bisects the weighted member 80 into left and right halves. A first leg plane 560 can then be defined as a plane passing through the first bend apex 230 and first leg apex 210 and being perpendicular to the median plane. Due to the blade mounting apertures and presence of one or more spacer members 240 along the first leg geometry, it is evident from FIGS. 2D and 2E that the first blade member 40 is constrained such that the leading end 480 is confined to being located on only one side—a forward side 580—of the first leg plane 560, while the trailing end 500 is also confined to being located on only one side—a rearward side 600—of the first leg plane 560. It can also be observed that the center of mass 300 of the first blade member 60 is confined such that it is also only capable of residing, or being located, on one side—the rearward side 600—of the first leg plane 560. From comparing the most forward pivot orientation 520 and the most rearward pivot orientation 540 of the first blade member 60 as shown in FIG. 2E, it can be also observed that the first blade member 60 of this embodiment is even further constrained to be able to pivot no more than 180 degrees, with such constraints or limits defined by the presence of a spacer member 240 located adjacent to the first blade member 60. Said differently, a pivot angle 620 of the first blade member 60 is constrained to be 180 degrees or less, with the pivot angle 620 being measured about an axis perpendicular to the median plane.

Figure 3A:
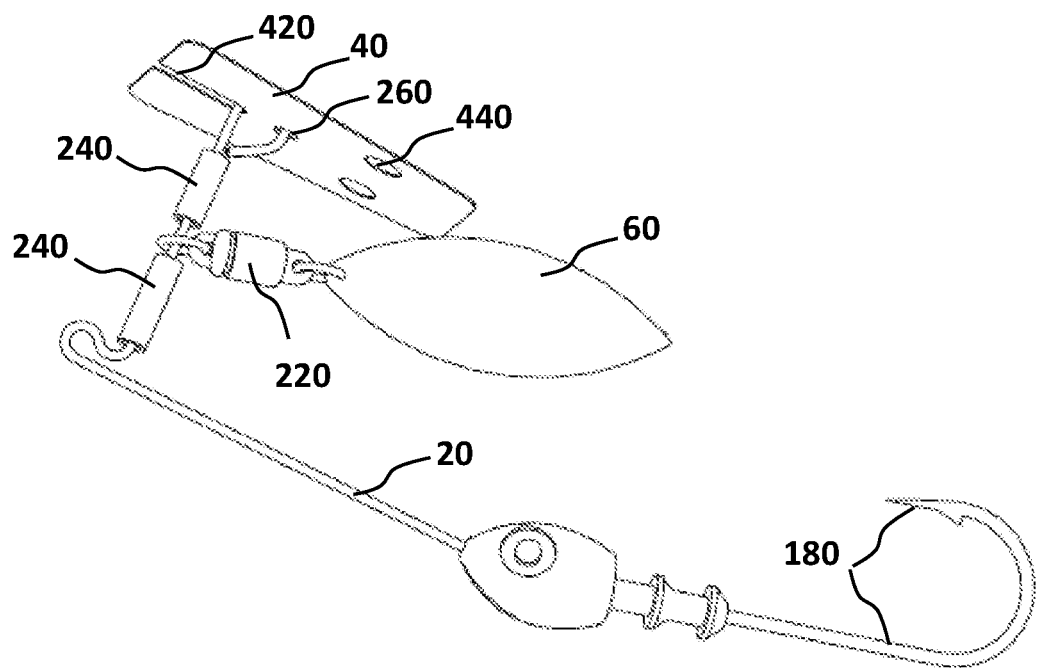
FIG. 3A is a diagrammatic perspective view of a second preferred embodiment of a lure with pivotable blade, in accordance with the present invention.
Figure 3B:
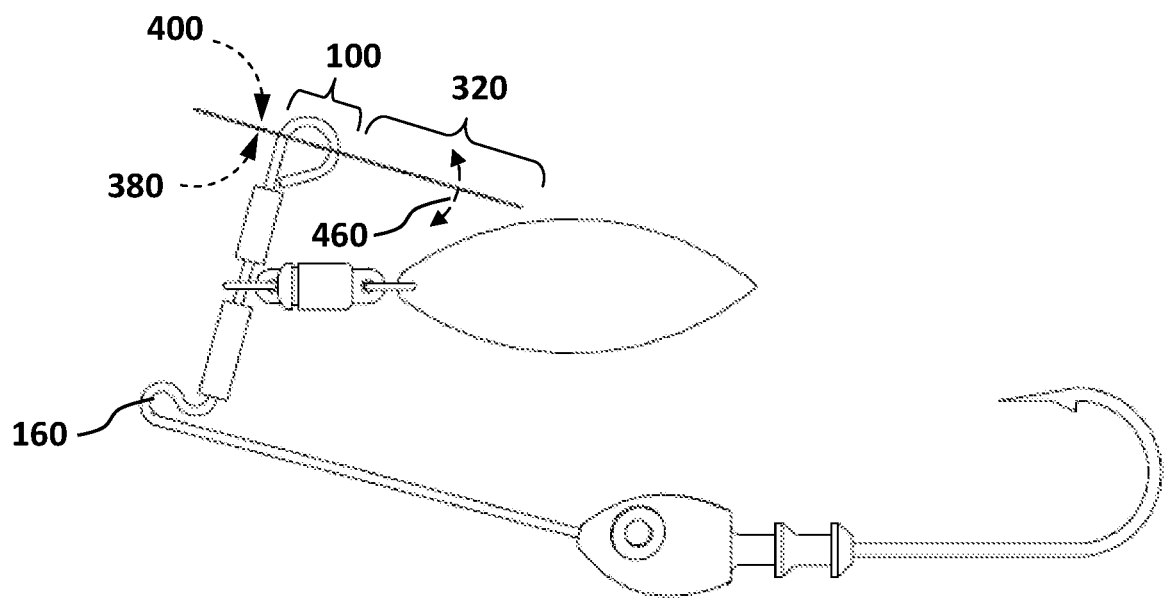
FIG. 3B is a diagrammatic side view of the second preferred embodiment.

FIGS. 3A and 3B illustrate a second preferred embodiment of the lure. Here the spacer members 240 are tubular or sleeve-shaped instead of bead-shaped. The second through hole of the first preferred embodiment has now been replaced by a slot 420, such that the looped portion 100 only enters and exits the first through hole 260. Said differently, the wire form member 20 passes only once through only one through hole, such that the first blade member 40 would slide off of the wire form member 20 if the first through hole 260 were not present. At least one additional through hole 440 is also shown to help create bubbles as the lure moves through the water. Note that the first blade member 40 again is constrained to pivot in a front-to-back direction 460, just like in the previous embodiment of the lure. The first blade member 40 again desirably has a first face 380 that substantially faces the eyelet 160 during retrieval of the lure. The second blade member 60 is again coupled to the wire form member 20 through a swivel 220.

Figure 4:
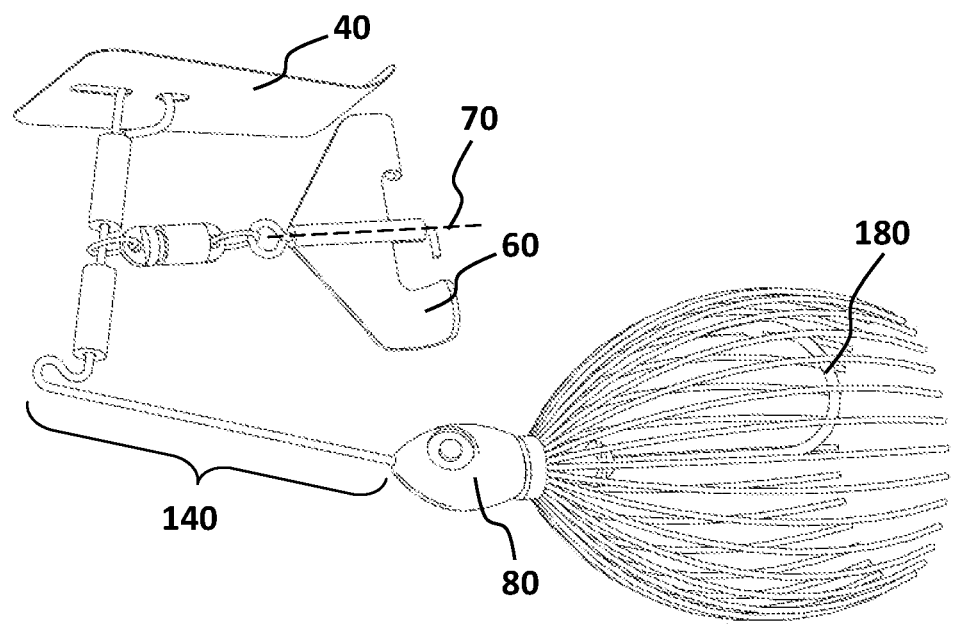
FIG. 4 is a diagrammatic perspective view of a third preferred embodiment of a lure wherein the second blade member is shaped like a propeller.
Figure 5:
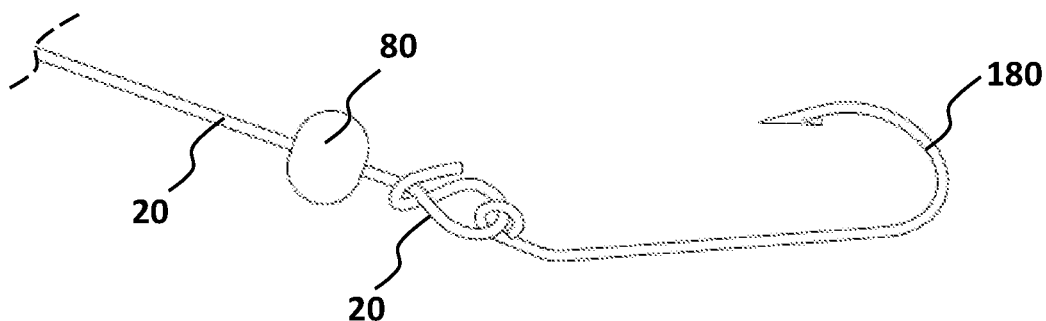
FIG. 5 is a partial view of a fourth preferred embodiment of a lure showing the bottom portion, wherein the hook is loosely coupled to wire form member.
Figure 6:
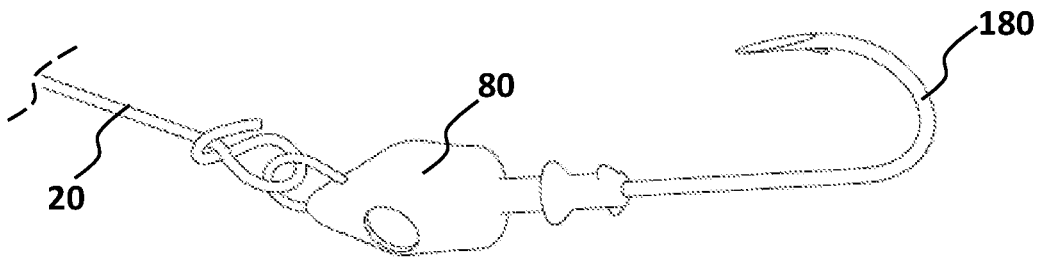
FIG. 6 is a partial view of a fifth preferred embodiment of a lure showing the bottom portion, wherein the weighted member is loosely coupled to the wire form member.

There are many variations of the preferred embodiments described herein. A blade member can be made from a plastic or elastomeric material in addition to a more common metallic material. The surface of a blade member can be coated with plastic or metallic reflective elements, such as glitter, metallic paint, or similar. The surface of a blade member can comprise a hammered texture, a diamond-type pattern, or any other non-smooth texture or pattern. Multiple blade members can be coupled to the same weighted member for additional fish attracting movements and behavior. At least one additional hole or aperture can be added to a blade member, in addition to the through holes previously illustrated. The second blade member 60 can be a propeller or vane-type shape, as shown in FIG. 4, and spin continuously similarly to the concave second blade member shapes previously described. In FIG. 4, just as in FIGS. 2A and 3A, it is evident that the second blade member 60 is located in space between the first blade member 40 and the weighted member 80. It is evident that the position of the second blade member 60 can also be described as being located between the first blade member 40 and the hook 180. The hook can be loosely coupled to the wire form member 80 as shown in FIG. 5, or it can be loosely coupled to the weighted member. As previously mentioned, the weighted member 80 can be loosely coupled to the wire form member 20, as shown in FIG. 6. The hook can be longer and contain the looped portion at one end such that the wire form member is merged with and becomes the hook itself. The spacer member can be flatter or elongated in shape, such as a disc, washer, tube, or sleeve-type shape. One or more rattle elements can be coupled to the wire form member or hook for generating additional underwater sounds as the lure is retrieved.

While certain preferred embodiments have been described and shown in the accompanying drawings, it is to be understood that such preferred embodiments are merely illustrative of, and not restrictive on, the broad invention. It is intended that the scope of the invention be defined by the following claims and their equivalents.

What is claimed is:

1. A fishing lure comprising:
   a wire form member comprised of a first leg and a second leg with an eyelet located therebetween; said first leg having only one looped portion;
   a weighted member coupled to said second leg;
   a hook coupled to said weighted member;
   a first blade member pivotably coupled to said looped portion, said looped portion passing through a first through hole of said first blade member, said first blade member constrained from pivoting more than 180 degrees relative to said looped portion;
   a spacer member surrounding said first leg and located along said wire form member between said first blade member and said eyelet, said spacer member limiting the pivoting motion of said first blade member in one direction;
   wherein said first blade member has a leading end and a trailing end;
   wherein said first blade member can be divided into a forward region between said leading end and said first through hole and a trailing region between said first through hole and said trailing end, said forward region being generally flat, said trailing region further comprising a concave side and an opposite convex side;
   wherein said first blade member is shaped and pivotably constrained in such a manner that generates lift;
   wherein said looped portion is the only looped portion coupled to a blade member along said first leg;
   a second blade member rotatably coupled to said first leg, said second blade member located between said first blade member and said weighted member or between said first blade member and said hook; and
   wherein said second blade member spins about its own longitudinal axis and only impacts said convex side as said lure is pulled forward in water.

2. The fishing lure in accordance with claim 1, wherein said weighted member is loosely coupled to said wire form member.

3. The fishing lure in accordance with claim 1, wherein the hook is loosely coupled to said wire form member.

4. The fishing lure in accordance with claim 1, wherein said spacer member is shaped like a sleeve.

5. The fishing lure in accordance with claim 1, wherein said second blade member is shaped like a propeller.

6. The fishing lure in accordance with claim 1, wherein said second blade member has a concave shape.

7. The fishing lure in accordance with claim 1, wherein said first blade member is made of metal.

* * * * *